United States Patent [19]
Peytavin

[11] 3,834,273
[45] Sept. 10, 1974

[54] METHOD FOR FACING THE ENDS OF PIPES

[75] Inventor: Pierre Peytavin, Neuilly-Sur-Seine, France

[73] Assignee: Societe amonyme dite: Vallourec (Usines a Tubes de Lorraine-Escaut et Vallourec Reunies), Paris, France

[22] Filed: July 5, 1972

[21] Appl. No.: 269,223

[30] Foreign Application Priority Data
July 9, 1971 France .............................. 71.25248

[52] U.S. Cl. .................... 90/11 C, 90/24 C, 408/1, 408/227
[51] Int. Cl. ............................................ B23b 3/12
[58] Field of Search .......... 90/24 C, 11 C, 14, 11 R, 90/12 R; 408/211, 227, 199; 82/4 C; 144/205

[56] References Cited
UNITED STATES PATENTS
2,948,196  8/1960  Branday .......................... 144/205 X
3,266,345  8/1966  Weiser et al. .................... 144/205 X

*Primary Examiner*—Gil Weidenfeld
*Attorney, Agent, or Firm*—Brisebois & Kruger

[57] ABSTRACT

Method and apparatus for facing or tooling the ends of pipes or steelworks and especially non-circular pipes, making use of a tool-holder moved in rotation in relation to the pipe or steelwork and moved in translation towards said pipe or steelwork, characterized in that each portion of said end being faced is submitted to the alternate cuts of at least two cutting blades, at least one of said cutting blades being so directed as to cut out the burrs produced by the other cutting blade on said end.

1 Claim, 2 Drawing Figures

3,834,273

METHOD FOR FACING THE ENDS OF PIPES

BACKGROUND OF THE INVENTION

This invention relates to a method and an apparatus for facing or tooling the ends of a pipe. The invention has particular application in facing the ends of non-circular pipes, for instance square or rectangular pipes, and also in facing the ends of other steelworks of non-circular section, the walls of which can be assimilated, in at least one part of their section, to the walls of the aforementioned pipes.

It is well known to face the ends of a pipe with various apparatus such as facing devices including a rotary tool-holder driven about the axis of the pipe, said tool-holder being simultaneously axially acted upon towards the end edge of the pipe in order to let the cutting member of the tool carried by said tool-holder continuously bite into the end edge of said pipe.

Generally the cutting blade of the tool-holder is directed in a fairly radial direction in order to prevent or limit the formation of burrs on the sides of the wall being tooled.

Unfortunately such devices cannot be conveniently used in facing the end edges of non-circular pipes, such as square pipes. Indeed such a tool when circularly rotated would pass along the walls of such pipes with an orientation generally non-perpendicular to said wall, which could produce on the sides of the wall the formation of burrs which would get enlarged after a succession of cuts, thus resulting in a subsequent tiresome and expensive burr-removing work.

Therefore one generally merely cuts down the ends of the non-circular pipes, as carefully as possible in order to possibly limit the formation of the burrs.

This invention relates to a method and an apparatus for tooling or facing the ends of pipes of any section, such as for example square or rectangular pipes, in a very simple way and at a very low expense.

SUMMARY OF THE INVENTION

Accordingly it is one aspect of the present invention to provide a method for facing or tooling the ends of pipes or steelworks and especially non-circular pipes, said method making use of a tool-holder moved in rotation in relation to the pipe or steelwork and moved in translation towards the end of said pipe or steelwork being faced, characterized in that each portion of said end is submitted to the alternate cuts of at least two cutting blades, at least one of said cutting blades being so directed as to cut out the burrs made by the other cutting blade on said end.

According to a further aspect of the present invention the tool holder is rotated about the axis of the pipe or steelwork.

In the facing of relatively regularly shaped pipes, such as square, weakly rectangular or regularly polygonal pipes, it is often possible to use only two cutting blades alternatively passing along the end edge of the pipe, one of said cutting blades being so directed as to practically continuously tend to make burrs on a given edge, for instance the peripheral edge of the end of the pipe, the other cutting blade being so directed as to bite into said edge and eliminate the beginning burrs being made.

These cutting blades can possibly be so arranged as to give rise to the formation of burrs on an opposite end edge, each of these cutting blades eliminating the burrs made by the other.

When the pipe has a more sophisticated shape, for instance a convex or strongly rectangular shape one can advantageously tool at each time the end portions located at the same distance from the axis of rotation of the tool-holder with a pair, or more, of tools differently directed according to the invention, the other portions located at a different distance from said axis being tooled by other corresponding pairs of tools.

It is still a further aspect of this invention to provide an apparatus for carrying out the described process, making use of a tool-holder moved in rotation in relation to the end of the pipe or steelwork and moved in translation towards said end, characterized in that said tool-holder is carrying at least two cutting blades into one same portion of the end of the pipe, at least one of said cutting blades being so directed as to eliminate the burrs made by the other cutting blade.

In a simple and preferred embodiment the tool-holder carries only two tools having differently directed cutting blades, said tools being angularly spaced on said tool-holder.

This embodiment is particularly adapted for the tooling of the ends of pipes having a square or nearly square shape. Thus one of said cutting blades can be so directed as to stand at an acute angle to the radius leading to the center of rotation, in order to give rise to burrs on the periphery of the square end, the other cutting blade standing at an obtuse angle to the corresponding radius and thus eliminating the burrs made by the first cutting blade.

However in a further embodiment, especially for tooling rectangular pipes, the apparatus according to this invention carries several groups of cutting blades, the cutting blades of one group being fairly on the same radius to the axis of rotation of the tool holder, said cutting edges of a same group being differently directed so that at least one of the cutting blades eliminates the burrs made by another cutting blade of the group.

The objects and features of the invention will be readily apparent to those skilled in the art from the specification and appended drawings wherein.

Figure 1:
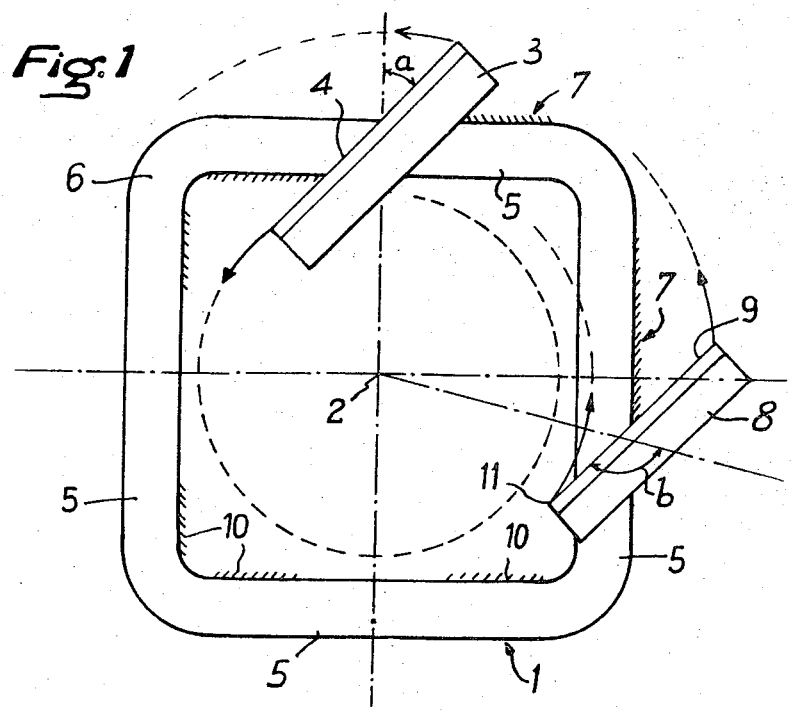
FIG. 1 is a schematic view of the end of a pipe runned over by two tools of a tool-holder of an apparatus according to the present invention.

Referring now to FIG. 1 it may be seen an end 1 of a square shaped pipe having a geometrical axis 2. This end 1 is seen from the tool-holder of an apparatus according to the present invention, but only the tools carried by the tool-holder are shown. The axis of rotation of the tool-holder is identical to the axis 2 of the pipe. This tool-holder carries a first tool 3, the cutting blade 4 of which is intended to tool the end of the pipe 1 in a plane perpendicular to the axis of said pipe.

The cutting blade 4 of the tool 3 is so directed as to stand at an acute angle $a$ to the median radius from the axis 2 to the center of the tool 3. When the tool-holder is rotated, the tool 3 is moved in rotation about the axis 2 and continuously tools the whole surface of the end of the pipe 1.

The angle $a$ is so selected as to continuously direct the cutting blade 4 with respect to the four sides 5 of the wall 6 of the pipe 1 in such a way that the tool 3 is always leaded to make burrs on the external edge of the wall 6. These burrs are schematically shown at 7 with their proper orientation.

One should easily understand that if the tool 3 was alone on the tool-holder, it would continuously make burrs on the periphery of the end of the pipe, these burrs getting enlarged after each rotation of the tool-holder.

The tool-holder still carries a second tool 8 the cutting blade 9 of which standing at this time at an obtuse angle *b* to a median radius passing through the axis 2. As it can be seen from the drawing this second tool is always leaded to bring the burrs into the inside of the pipe, contrarily to the tool 3. One can see at 10 the burrs directed towards the inside of the pipe and made by this tool 8 during its rotation.

As it can readily be understood from the drawing the tool 8 will deal with the external burrs made by the tool 3 and eliminate these burrs 7 at each rotation, whereas the tool 3 which makes the burrs 7 will eliminate at each rotation the burrs 10 made by the tool 8.

Thus the different burrs which are made are eliminated at each rotation so that the tooling is carried on without formation of burrs.

It is well understood that due to the fact that the tool 3 only creates burrs 7 directed towards the periphery, at the external side of the pipe, it could be possible to use a tool 8 which does not get, in any position, into the inside of the pipe, which furthermore eliminates the formation of the burrs 10, the tool 8 merely eliminating then the burrs 7 without making burrs by itself. One should easily understand that the possibility of having a tool 8 without making internal burrs 10 will depend on the thickness/width ratio of the pipe 1.

The pipe 1 must indeed have a sufficient thickness with respect to its width in order to allow to the point 11 of the tool, which is closest to the axis to continuously remain out of the internal edges of the sides 5 of the square.

As a matter of fact it would be possible, instead of having between the tools 3 and 8 the angular distance shown at the FIG. 1 which is slightly above 90°, to settle the tools 3 and 8 at any angular distance, for instance at 180°.

It could also be possible to have more than two tools, the number of tools being not necessary even.

Thus for instance it could be possible to use in the apparatus of FIG. 1 a third tool, the cutting blade of which would be at this time radially directed and would alternatively make burrs on one edge, then on the other edge of a same side 5, these burrs being eliminated by the tools 3 and 8 respectively.

One readily understands that the apparatus of FIG. 1 is also adapted for the tooling of pipes having a weakly marked rectangular or oval shape or a regular convex polygonal shape.

For the tooling of large square pipes the tools 3 and 8 would necessarily have very long cutting blades to be able to continuously tool the end of the pipe in spite of the very important differences between the radius of the central portions of the sides of the pipe and these of the corners which connect the sides of the pipe. In that case one can advantageously use several pairs of tools such as 3 or 8, located at different distances from the central axis 2, each of these tolls dealing on each side 5 with the tooling of two portions nearly symmetrically located with respect to the symmetry plane of the sides 5.

Figure 2:
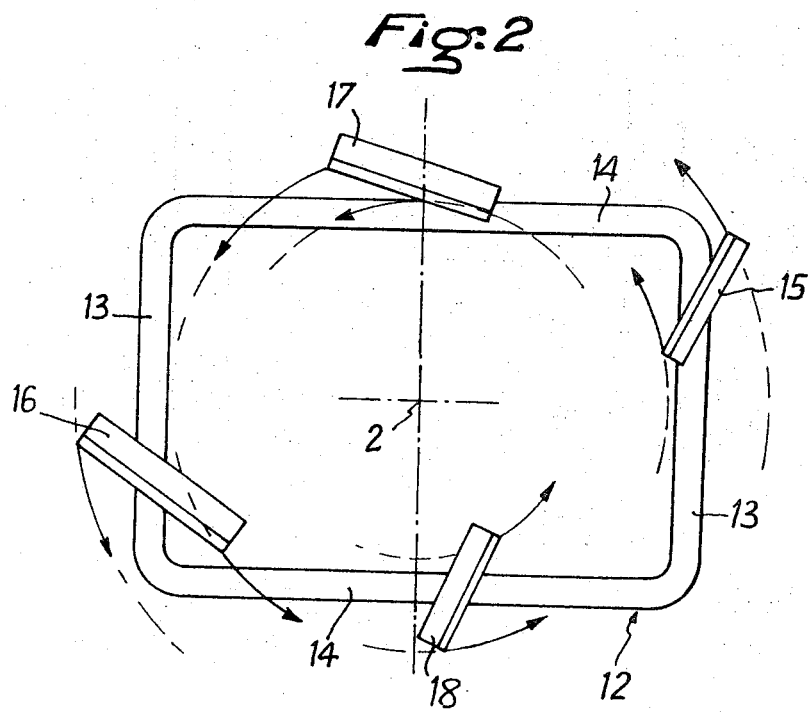
FIG. 2 is a view of the end of a rectangular pipe showing a tool-holder carrying four tools with cutting blades according to the present invention.

Referring now to FIG. 2 it may be seen the tooling of a rectangular pipe 12 having two small sides 13 and two large sides 14. As it can be seen from the drawing, the small sides are taken up by two tools 15 and 16 diametrically opposed with respect to the axis 2 of the tool-holder, confounded with the axis of the pipe, the cutting blade of the tool 15 bringing continuously the burrs towards the internal edge of the side 13, whereas the cutting blade of the tool 16 eliminates these burrs and continuously makes burrs on the external edge of the sides 13, said last burrs being eliminated by the cutting blade of the tool 15.

The large sides 14 which are mostly located nearer the axis 2 than the small sides 13 are taken up by a pair of tools 17 and 18. The cutting blade of the tool 17 tends to make burrs directed towards the inside whereas the cutting blade of the tool 18 tends to make burrs directed towards the outside of the pipes, each of the tools eliminating the burrs made by the other.

It is well understood, that according to the dimensions of the rectangular pipe, one can also use more than two pairs of tools located at different distances to the axis 2, these pairs of tools tooling without burrs their respective portions.

One can readily see that the invention can be carried out very easily due to the fact that the method according to the invention may be carried out with conventional tooling or facing devices including a rotative tool-holder carrying tools the cutting blades of which are differently directed as hereinbefore described. Furthermore it is possible, with the apparatus according to the invention, to tool the end edges of circular pipes, so that the same apparatus may be indifferently used for circular pipes and non-circular pipes without changing the tools.

While certain preferred embodiments of the invention have been specifically disclosed it should be understood that the invention is not limited thereto as many variations will be readily apparent to those skilled in the art and the invention is to be given its broadest possible interpretation within the terms of the following claims.

I claim:

1. In a method of facing the end of a tubular member comprising the steps of providing at least one first elongated cutting blade and at least one additional cutting blade at spaced locations along the perimeter of said member, positioning said first and additional blades substantially perpendicular to the walls of said member, locating the cutting edges of said cutting blades inclined to the radial planes of said member so that the angle formed between the cutting edge of one of said cutting blades and said radial planes is less than 90° and the corresponding angle between the cutting edge of the other of said blades and said radial planes is more than 90°, rotating said cutting blades at the same speed and about a single axis parallel to the walls of said member while simultaneously urging said cutting blades along said axis into contact with the end of said member, whereby the cutting action of one of said cutting blades faces the end of said member and also causes the formation of radial burrs on the edge thereof and the other of said cutting blades follows said cutting action and removes the burrs formed thereby.

* * * * *